United States Patent [19]

Maglica

[11] Patent Number: 5,515,246
[45] Date of Patent: May 7, 1996

[54] HOLDER CLAMP ASSEMBLY

[75] Inventor: Anthony Maglica, Anaheim, Calif.

[73] Assignee: Mag Instrument, Inc., Ontario, Calif.

[21] Appl. No.: 105,451

[22] Filed: Aug. 11, 1993

Related U.S. Application Data

[63] Continuation-in-part of Ser. No. 14,622, Feb. 8, 1993, Pat. No. 5,270,911, which is a continuation of Ser. No. 884,731, May 15, 1992, Pat. No. 5,184,884, which is a continuation of Ser. No. 764,148, Sep. 20, 1991, Pat. No. 5,128,841, which is a continuation of Ser. No. 537,497, Jun. 13, 1990, Pat. No. 5,062,026, which is a continuation-in-part of Ser. No. 285,734, Dec. 16, 1988, Pat. No. 4,980,805.

[51] Int. Cl.⁶ .................................................. F21L 15/14
[52] U.S. Cl. .............................. 362/72; 362/191; 362/396
[58] Field of Search ............................... 362/72, 190, 191, 362/396, 285, 269, 289, 418, 421, 427; 248/181, 288.3; 403/90, 130, 131, 141, 142, 122; 340/432

[56] References Cited

U.S. PATENT DOCUMENTS

| | | | |
|---|---|---|---|
| 363,525 | 5/1887 | Lipp . | |
| 555,183 | 2/1896 | Rhind | 362/396 X |
| 568,406 | 9/1896 | Howard | 248/288.3 |
| 577,156 | 2/1897 | Bragger | 362/396 X |
| 578,014 | 3/1897 | Homan | 362/396 X |
| 606,914 | 7/1898 | Bragger | 362/72 X |
| 926,114 | 6/1909 | Hall | 362/421 |
| 958,052 | 5/1910 | Williams | 403/142 |
| 973,319 | 10/1910 | Thunen | 362/396 X |
| 1,186,428 | 6/1916 | Newman | 362/421 |
| 1,393,158 | 10/1921 | Pawsat | 362/72 |
| 1,449,509 | 3/1923 | Graves | 362/72 |
| 1,722,773 | 7/1929 | Stewart | 362/421 |
| 2,029,532 | 2/1936 | Karcher | 287/12 |
| 2,442,736 | 6/1948 | Valentine | 362/421 |
| 2,533,867 | 12/1950 | Zink | 248/276 |
| 3,194,526 | 7/1965 | Lemmond | 248/226 |
| 3,392,983 | 7/1968 | Hajner | 277/28 |
| 3,539,234 | 11/1970 | Rapata | 308/238 |
| 3,584,822 | 6/1971 | Oram | 362/421 |
| 3,843,083 | 10/1974 | Angiband | 248/229 |
| 3,972,396 | 8/1976 | Bochnak | 188/321 |
| 4,170,337 | 10/1979 | Davis | 248/475 R |
| 4,304,251 | 12/1981 | Schadel et al. | 137/240 |
| 4,321,660 | 3/1982 | Sokol | 362/421 |
| 4,357,651 | 11/1982 | Mayer | 362/375 |
| 4,399,498 | 8/1983 | Bacevius | 362/396 |
| 4,477,865 | 10/1984 | Tsuyama | 362/396 |
| 4,506,317 | 3/1985 | Doddy | 362/396 |
| 4,694,848 | 9/1987 | Jorgensen et al. | 136/114 |
| 4,834,137 | 5/1989 | Kawaguchi et al. | 137/557 |
| 4,980,805 | 1/1990 | Maglica et al. | 362/72 |
| 5,062,026 | 10/1991 | Maglica et al. | 362/72 |
| 5,109,321 | 5/1992 | Maglica et al. | 362/72 |
| 5,128,841 | 7/1992 | Maglica et al. | 362/72 |
| 5,144,546 | 9/1992 | Burdi | 362/72 X |
| 5,181,774 | 1/1993 | Lane | 362/72 |
| 5,184,884 | 2/1993 | Maglica et al. | 362/72 |

FOREIGN PATENT DOCUMENTS

| | | |
|---|---|---|
| 2205957 | 5/1974 | France . |
| 2307826 | 8/1974 | Germany . |
| 2075589 | 11/1981 | United Kingdom . |

*Primary Examiner*—Ira J. Lazarus
*Assistant Examiner*—Thomas M. Sember
*Attorney, Agent, or Firm*—Lyon & Lyon

[57] ABSTRACT

A holder clamp assembly having a compressible, substantially spherical gripping member with a centrally located cavity, a compressing mechanism, a mounting bracket, and optionally a swivel joint. The cavity of the gripping member is a channel for receiving the barrel of a flashlight or other substantially cylindrical and elongated section of a device. The gripping member while holding the device may pivot inside the compressing mechanism. The compressing mechanism constricts the gripping member around the device holding the device in place. The optional swivel joint connects the compressing mechanisms to the mounting bracket. When the optional swivel joint is used, the mounting bracket once tightened on a substrate holds the swivel joint in place. One member of the mounting bracket when inverted relative to the other members, enables clamping onto smaller substrates.

27 Claims, 13 Drawing Sheets

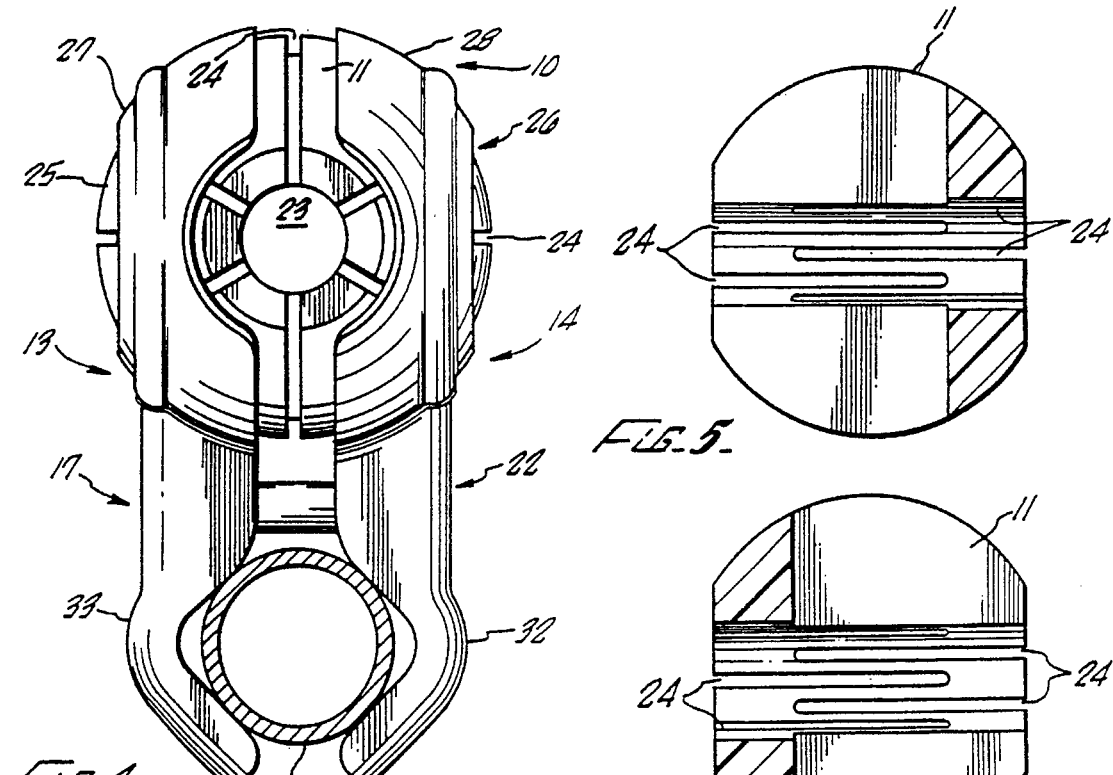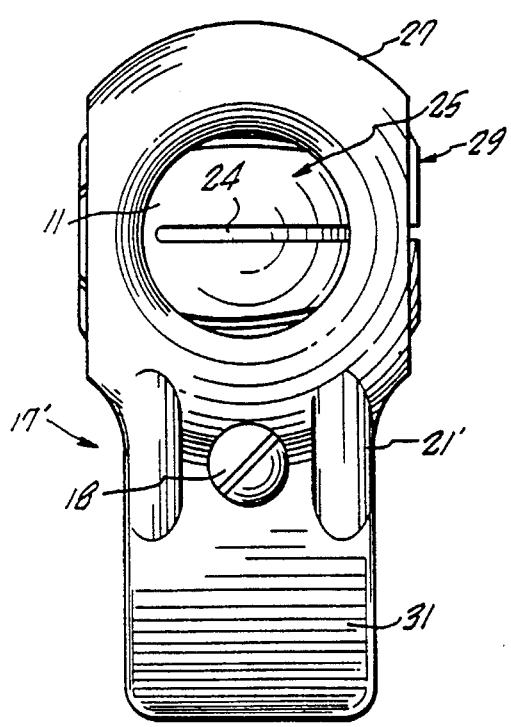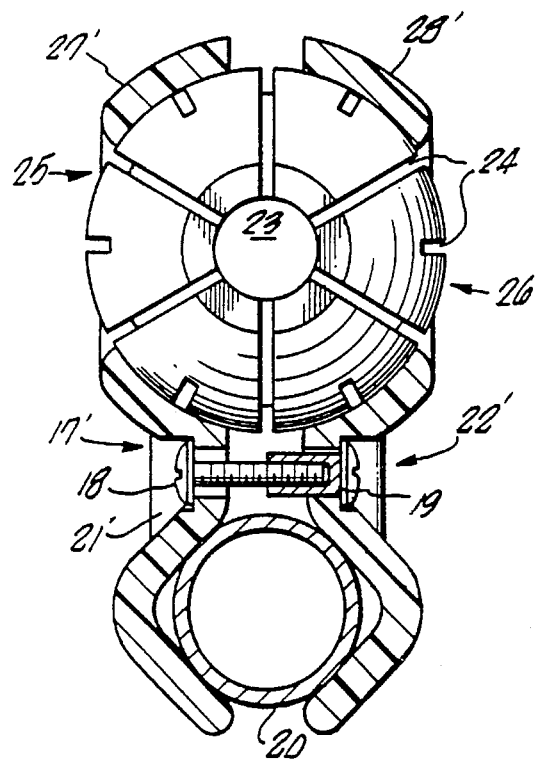

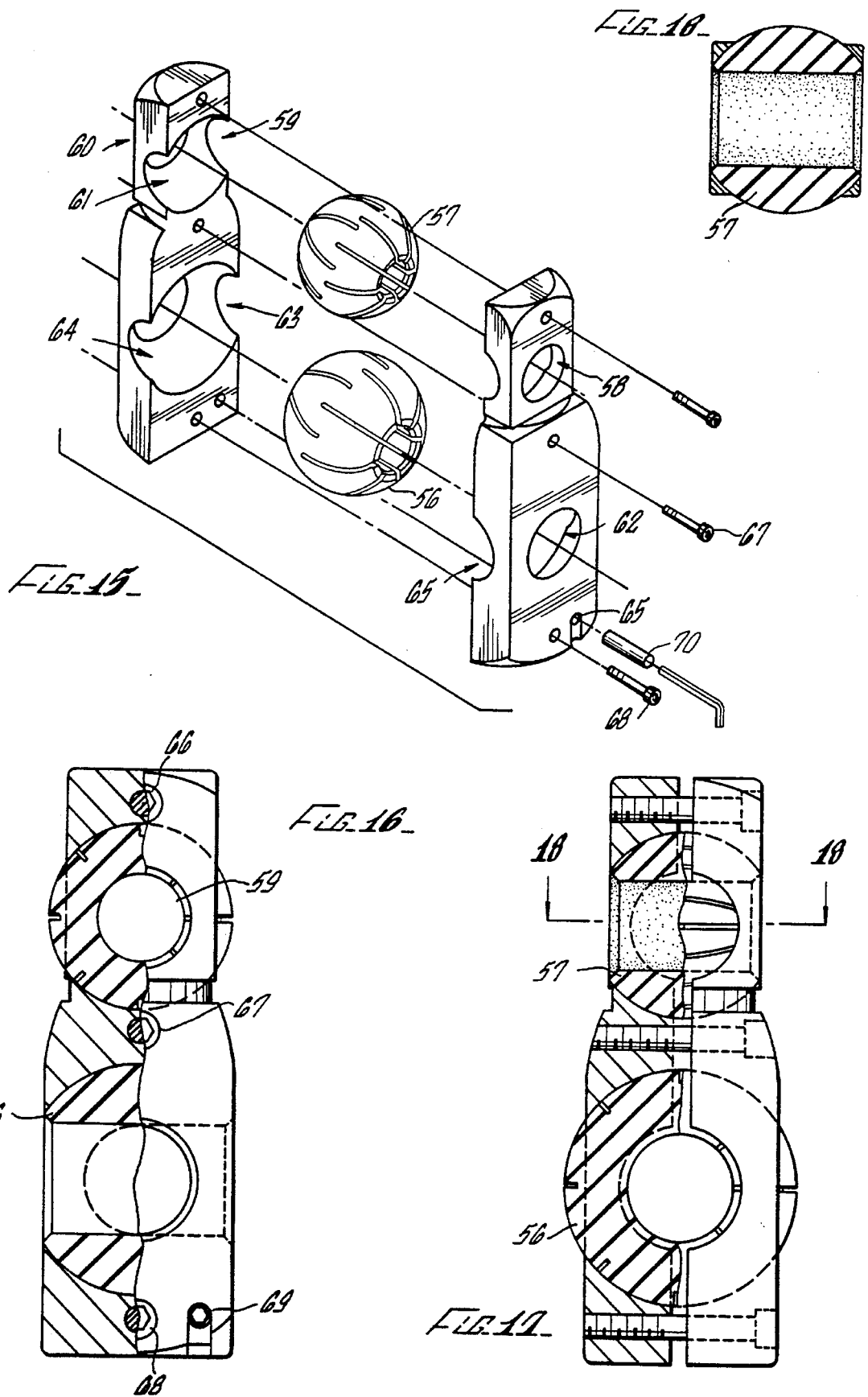

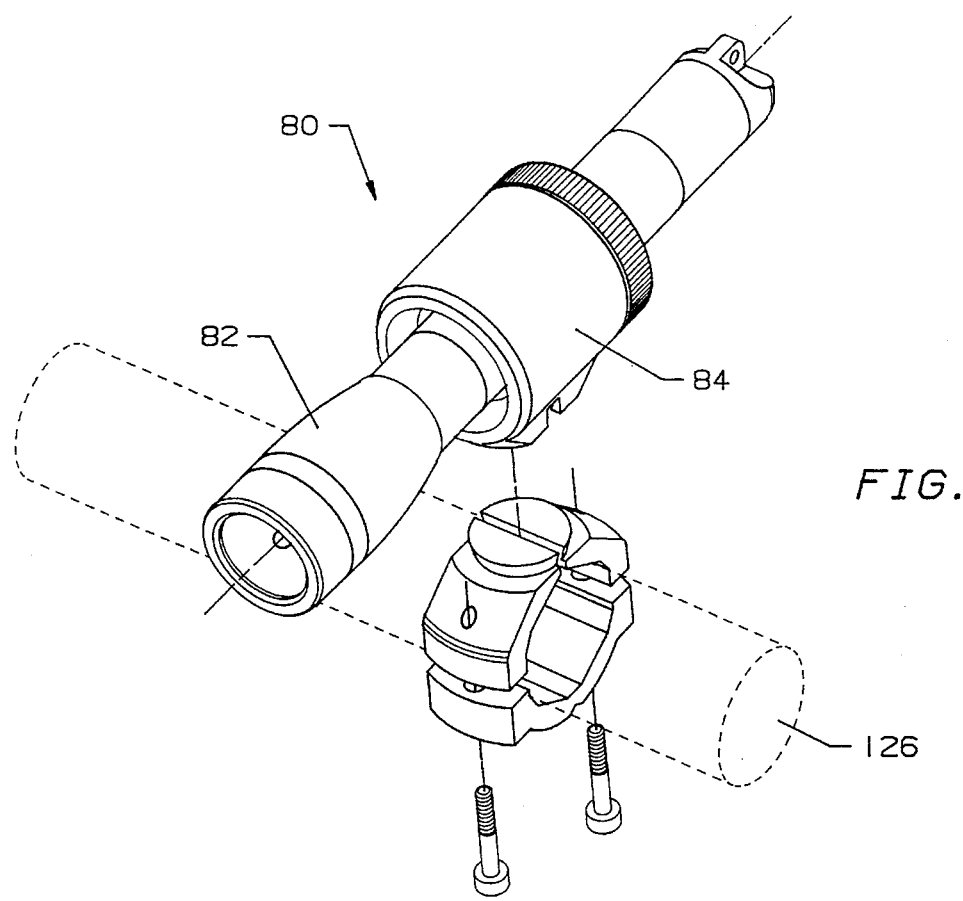
FIG. 20
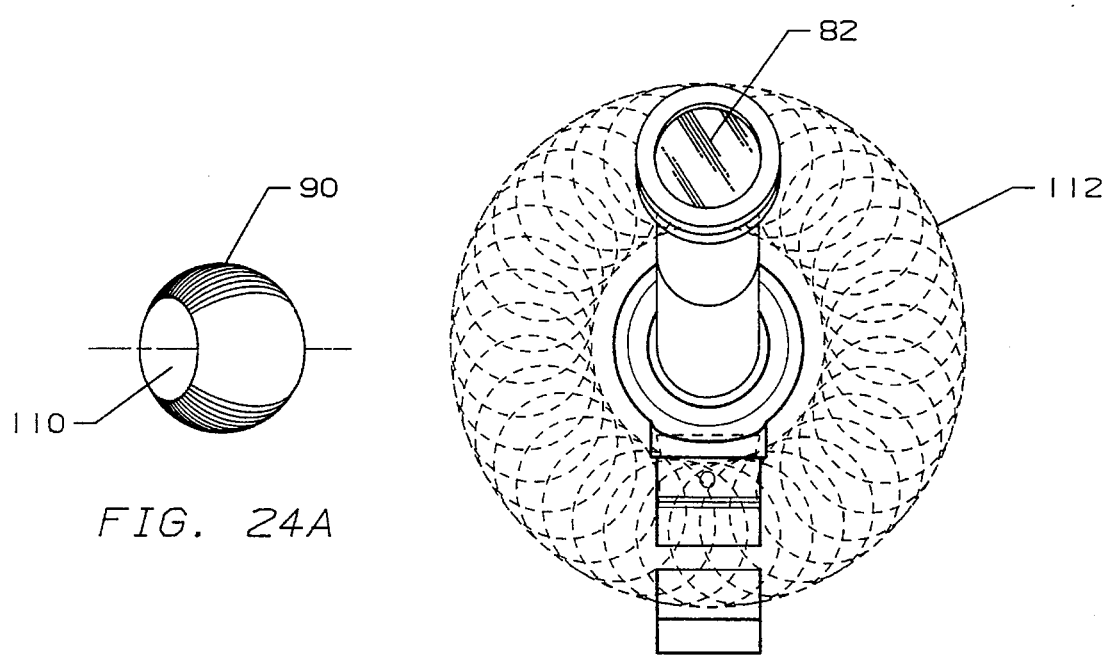
FIG. 24A
FIG. 24B

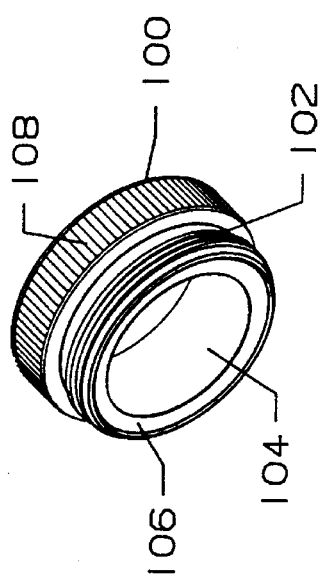
FIG. 23A
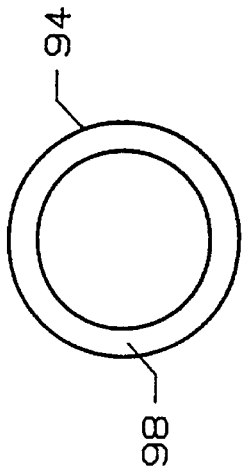
FIG. 23B
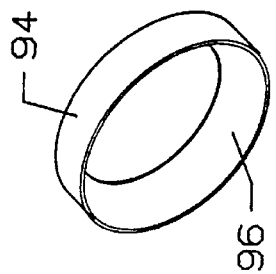
FIG. 22A
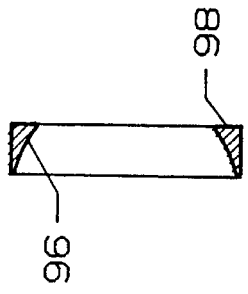
FIG. 22B
FIG. 22C
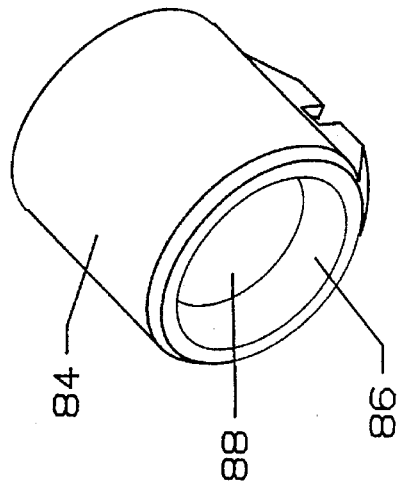
FIG. 21A
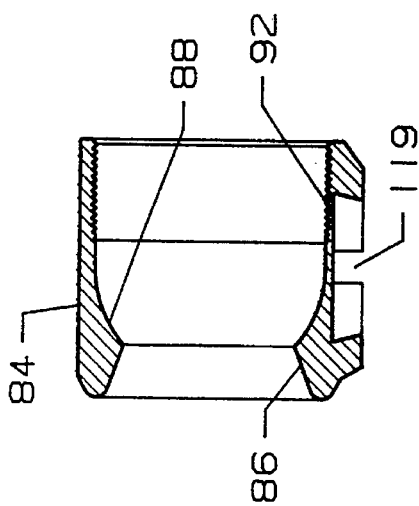
FIG. 21B 5,515,246

HOLDER CLAMP ASSEMBLY

This is a continuation-in-part of U.S. application Ser. No. 08/014,622, now U.S. Pat. No. 5,270,911, filed Feb. 8, 1993; which is a continuation of Ser. No. 884,731, filed May 15, 1992, U.S. Pat. No. 5,184,884; which is a continuation of Ser. No. 764,148, filed Sep. 20, 1991, U.S. Pat. No. 5,128,841; which is a continuation of Ser. No. 537,497, filed Jun. 13, 1990, U.S. Pat. No. 5,062,026; which is a continuation-in-part of Ser. No. 285,734, filed Dec. 16, 1988, U.S. Pat. No. 4,980,805.

BACKGROUND OF THE INVENTION

The field of the present invention is a device mounting apparatus.

Hand held flashlights of various sizes, shapes, and containing various features are well known. Flashlights having particularly desirable features include those described in U.S. Pat. Nos. 4,577,263; 4,658,336; 4,899,265; 4,656,565; and 4,851,974. It is also well known that bicycles may be equipped with lights for use after dark. It would, therefore, be highly desirable to provide a clamp assembly by which a flashlight could be secured to the handlebars of a bicycle and adjustable about a variety of axes. Such clamp assembly should also be economical to manufacture and easily adjustable. It would also be desirable to provide an assembly which has an adjustable mounting for a flashlight for use on other support including those where the axis of the support structure is parallel to the axis of the barrel of the flashlight, such as for use in conjunction with a rifle. It would also be desirable to provide an assembly which has the capability of adjusting the angle of the clamp itself with respect both to the support structure and to the flashlight.

SUMMARY OF THE INVENTION

The present invention is directed to an adjustable, portable mount for holding a device in a compressible member in many orientations relative to the mount and providing a means for attaching the mount with a mounting bracket. To this end, a compressible member having a cavity is placed inside a compressing mechanism. The device to be mounted is placed inside the cavity, and the compressing mechanism compresses the compressible member thus holding the device to be mounted in place. Further, the compressing mechanism is attached to a mounting bracket which can be clamped onto, for example, a bicycle frame, rifle barrel, wheel barrow handle, or lawn mower handle and other elongated members.

In a first, separate aspect of the invention, the compressing mechanism is attached to the mounting bracket with a swivel joint. To this end, the compressing mechanism defines a hollow frustum, and the mounting bracket defines a solid frustum which fits inside the hollow frustum. The solid frustum then rotates inside the hollow frustum.

In a second, separate aspect of the invention, the mounting bracket is a double clamping and locking mechanism. The mounting bracket clamps to the substrate and is locked thereto, and it clamps the pivot joint and locks it in position.

In a third, separate aspect of the invention, a member of the mounting bracket can be inverted relative to the other members such that the mounting bracket is compatible with smaller substrates.

In a fourth, separate aspect of the invention, the mounting apparatus is adjustable about a plurality of axes and the received device can be adjusted rotatably and longitudinally within the mounting apparatus.

Accordingly, it is an object of the present invention to provide an improved adjustable mount. Other and further objects and advantages will appear hereinafter.

BRIEF DESCRIPTION OF THE DRAWINGS

FIG. 4 is a side view of the FIG. 1 assembly taken at the same angle as the FIG. 2 view.

FIG. 5 is a partial cross-sectional, top view of the gripping sphere.

FIG. 6 is a partial cross-sectional, bottom view of the gripping sphere.

FIG. 7 is a side view of an assembly made with a plastic material.

FIG. 8 is a cross-sectional, side view of the FIG. 7 assembly with the gripping sphere in place.

FIG. 15 is an exploded perspective view of a fifth preferred embodiment of the flashlight holder clamp assembly.

FIG. 16 is a side elevation, partial cross-section view of the FIG. 15 assembly.

FIG. 17 is a front elevation, partial cross-section view of FIG. 15 assembly.

FIG. 18 is a horizontal, partial cross-section view of the FIG. 15 assembly taken along line 18—18 of FIG. 17.

FIG. 20 is a perspective view of the holder clamp assembly holding a flashlight perpendicular to the substrate.

FIG. 21A is a perspective view of the compressing mechanism body.

FIG. 21B is a cross-section of the compressing mechanism body.

FIG. 22A is a perspective view of the compressing mechanism washer.

FIG. 22B is a cross-section of the compressing mechanism washer.

FIG. 22C is a rear view of the compressing mechanism washer.

FIG. 23A is a perspective view of the compressing mechanism lock.

FIG. 23B is a cross-section of the compressing mechanism lock.

FIG. 24A is a perspective view of the gripping member.

FIG. 24B is an illustration of possible positions obtained by rotating the gripping member in the compressing mechanism.

DETAILED DESCRIPTION OF THE PREFERRED EMBODIMENT

Figure 1:
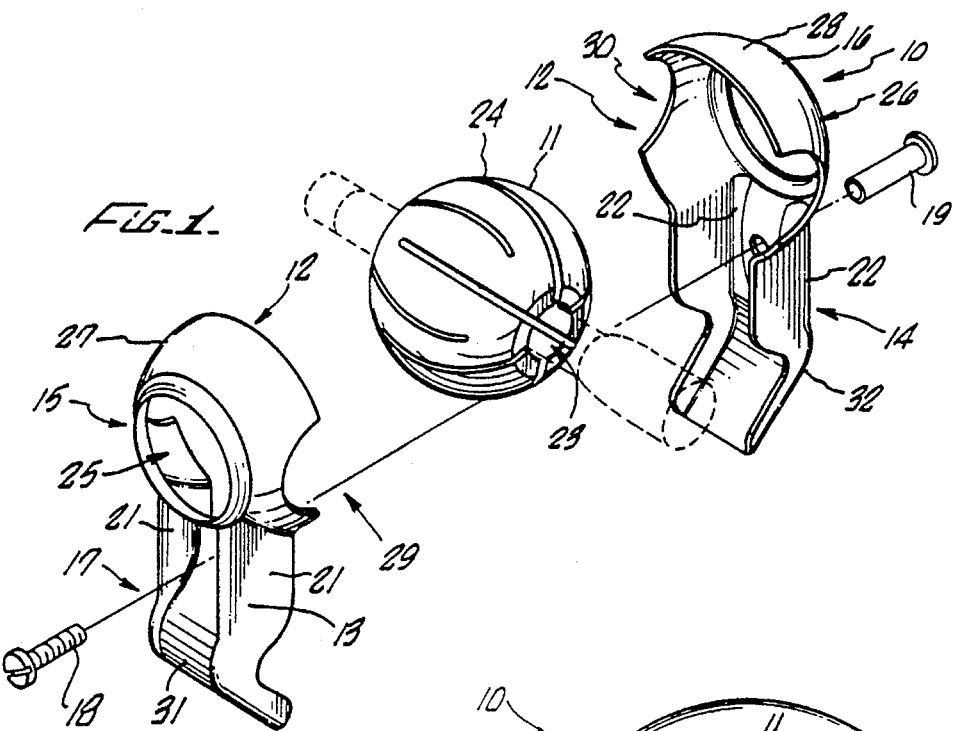
FIG. 1 is an exploded perspective view of a flashlight holder clamp assembly.

By reference to FIGS. 1–29, preferred embodiments of the device will be described.

By the several embodiments, clamps for securely holding hand held flashlights and for clamping such hand held flashlights at an appropriate location on a substrate such as a bicycle frame or handlebar are disclosed. The clamps are designed to receive an elongated substrate as, for example, tubular shaped objects. In certain of the embodiments, the clamp is such that a flashlight held may be oriented so that the flashlight beam shines in a variety of directions including the direction of the elongated axis of the substrate upon which the clamp is positioned or in a direction substantially perpendicular to the elongated axis of the substrate. Further, the holder for the flashlight may be adjusted to provide some range of angular orientation with respect to a predetermined reference direction. This adjustment may be both horizontal and/or vertical and the clamp itself may be adjusted rotationally or perpendicularly with respect to the axis of the substrate to which it is attached.

One embodiment of the holder clamp assembly includes a truncated spherical gripping member adapted to fit about a portion of the barrel of the flashlight, a mounting bracket adapted to fit about the spherical gripping member and to clamp onto the handlebar or other substrate support member to which the assembly is to be secured, and a fastening member for drawing the mounting bracket tightly about the gripping member and the support member. Upon tightening the fastening member, the assembly is secured to the substrate support member such as, for example a bicycle handlebar, and the gripping member is constricted about the flashlight barrel to secure the flashlight in place in a desired angular orientation with respect to the support member.

The spherical gripping member of this embodiment defines a plurality of uniformly spaced longitudinal slots which communicate along their inner ends with the central cylindrical channel therein to provide uniform constriction of the gripping member about the flashlight. The spherical gripping member is contained within an upper region of the mounting bracket defined by an upper forward portion thereof and an upper rearward portion wherein the inner periphery of the adjacent portions defines a curvature to smoothly adjoin the outer periphery of the spherical portion of the gripping member such that upon drawing the two portions together about the gripping member, the gripping member is constricted about the flashlight barrel.

The adjacent upper forward and upper rearward portions of the mounting bracket may define two perpendicularly disposed pairs of aligned apertures therein, a forward and rearward facing pair and a lateral facing pair. A selected one of the pairs of apertures receives the portion of the flashlight barrel protruding from the spherical gripping member and thereby allows the flashlight to be held by the gripping member within the mounting bracket in a selected orientation with respect to the support member.

The mid region of the forward and rearward portions of the mounting bracket provide for an attaching and tightening means such as for example a male/female screw. The lower ends of the forward and rearward portions of the mounting bracket are configured to fit the handlebars such that upon tightening of the male/female screw, the forward and rearward portions of the mounting bracket are drawn together, to constrict the spherical gripping member in the upper portion thereof. At the same time, the lower ends of the bracket are drawn tightly about the support member, thereby securing the flashlight in place on the support member.

Prior to tightening of the screw fastener, the gripping member with the flashlight protruding therefrom may be rotated within the upper region of the mounting bracket to bring the flashlight into the desired angular orientation with respect to the support member. Tightening of the screw fastener secures the flashlight in place.

The forward and rearward facing apertures and the upper forward and upper rearward portions of the mounting bracket permit orientation of the gripping member and the flashlight so that the beam of light may be directed generally perpendicularly in either a forward or rearward direction from the longitudinal axis of a support member, such as the bicycle handlebar. The allowable rotational movement of the gripping member within the mounting bracket permits the gripping member to be oriented so that the beam of light can be readily adjusted upwardly, downwardly or to the left or to the right from a direction precisely perpendicular to the longitudinal direction of the handlebar. It should also be noted that the lateral apertures formed by the upper forward and upper rearward section also provide for orientation of the gripper member so that the flashlight may be pointed in either a forward or rearward direction along the longitudinal direction of the support structure.

In other embodiments, the adjustable mounting bracket may have provision for only a forward and rearward facing pair of aligned apertures for receiving the flashlight barrel and only a lateral facing pair of aligned apertures for clamping onto a support structure. Such an embodiment would be primarily intended for use on a bicycle.

In a further embodiment, the upper portion as well as the lower portion of the adjustable mounting clamp are provided with spherical gripping members, so that a predetermined range of vertical and/or horizontal adjustment of the flashlight with respect to the clamp and radial and other adjustment of the clamp with respect to the support structure may be achieved. In this embodiment, an upper and lower pair of aligned apertures are oriented 90° with respect to each other. In another embodiment, there are two pairs of upper aligned apertures oriented 90° with respect to each other and two pairs of lower aligned apertures oriented 90° with respect to each other. In this embodiment, spherical gripping members are provided both for the upper portions and for the lower portions. This embodiment provides for greater flexibility and degree of adjustment of direction of the flashlight beam with respect to the support structure.

The greatest flexibility and degree of adjustment of direction is provided in another embodiment which utilizes a swivel joint. In this embodiment separate tightening mechanisms are provide to constrict the gripper and mounting bracket to the support structure.

The gripping sphere is preferably made of a material that has good strength, elasticity and forming characteristics, such as one of many nylon base materials commercially available. The mounting bracket may be made of metal, or may also be made of plastic materials. The fastener may be a conventional male/female screw fastener, or may be any one of a number of conventional fastening means such as a thumb screw, wing nut, or allen socket type screw. In one of the embodiments, the slot in the head of the screw is sized to accommodate a coin, such as a U.S. quarter, or other common coin depending on the country of interest, so that the coin may be used as a screwdriver.

Figure 2:
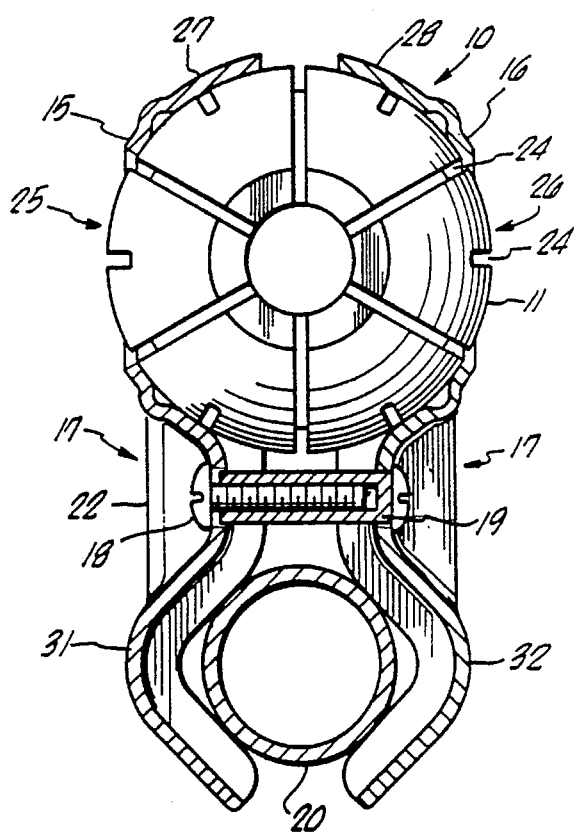
FIG. 2 is a cross-sectional, side view of the FIG. 1 assembly.
Figure 3:
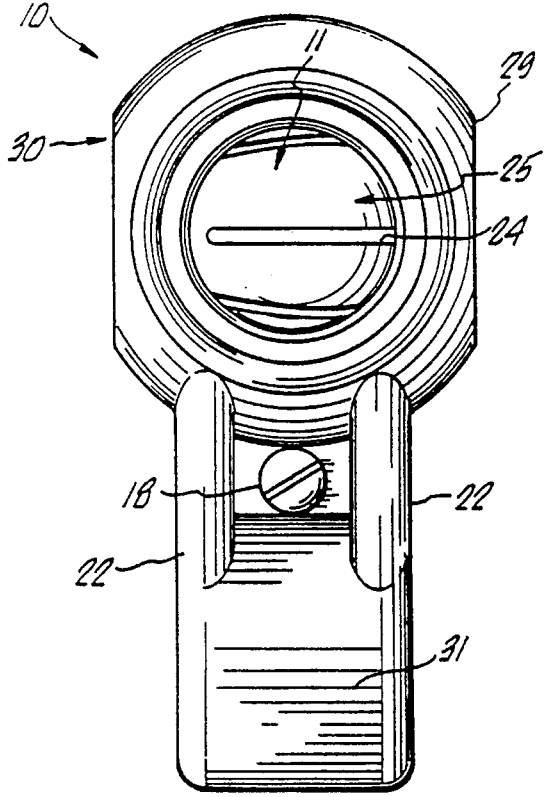
FIG. 3 is a side view of the FIG. 1 assembly taken at 90° from the FIG. 2 view.

Turning specifically to the drawings and referring to FIGS. 1, 2 and 3, an exploded perspective view, a cross-sectional, and a side view of a first embodiment is shown generally as 10. The flashlight holder clamp assembly generally comprises a truncated spherical gripping member 11 and a mounting bracket 12 having a first member 13 and a second member 14. The gripping member 11 is preferably made of a plastic material such as one of the many nylon based materials commercially available. Because the truncated spherical gripping member 11 functions to close down upon or constrict the flashlight barrel upon tightening of the mounting bracket 12, other materials of construction for the gripping member which will permit this function are acceptable. Shown in FIG. 1 in phantom is a flashlight positioned within the spherical gripping member 11. The spherical gripping member 11 is contained within the upper regions of a forward portion 15 of the first member 13 and rearward portion 16 of the second member 14 of the mounting bracket 11. The mounting bracket 12 has a mid-region 17 for containing a fastener such as a male/female screw fastener shown with male portion 18 and female portion 19 for drawing together the forward and rearward portion of the mounting bracket 12 about the gripping member 11 and a bicycle handlebar, as will be described. The mounting bracket 12 also has a lower forward and rearward portion generally shown as clamping around a bicycle handlebar 20 or other support structure as shown in FIG. 2. Reinforcing ribs 21, 22 provide an additional measure of support between the upper and lower regions of the first and second members 13 and 14 of the mounting bracket 12. In the preferred embodiments the support structure 20 is intended to be a conventional handlebar of a bicycle along the region where the handlebar extends longitudinally in a direction perpendicular to the straight-ahead path of the bicycle.

As mentioned above, the spherical gripping member 11 is preferably made of a plastic material. The gripping member has a centrally disposed cylindrical channel extending therethrough of sufficient diameter to accommodate a flashlight barrel. In order to accommodate different sized flashlight barrels, as for example to accommodate an AA or AAA sized flashlight barrel, gripping member 11 may be constructed with different channels 23 of varying cross-sectional diameters but having the same outer diameter in order to fit snugly within the mounting bracket 12. Alternatively the spherical gripping member 11 may be constructed with a large channel diameter and one or more inserts of the same or equivalent material may be provided so that the insert will fit into the channel 23 with the inner diameter of the insert being sized to accommodate the barrel of a flashlight of chosen size. Also, the spherical gripping member 11 has a plurality of uniformly spaced longitudinal slots 24 cut into the body of the gripping member 11 to provide for even constriction, i.e., distribution of the clamping or holding force upon the flashlight barrel with tightening of the male/female screw fastener portions 18, 19. It should be noted that the flashlight mounting bracket, and in particular the slots 24 of the spherical gripping member 11, may be presented in a number of aesthetically pleasing ways. For example, one preferred embodiment of the flashlight holder clamp assembly is shown in U.S. Design Pat. No. D 308,731, entitled Flashlight Holder Clamp Assembly.

The upper portions of the mounting bracket 12 are provided with a pair of circular axially aligned apertures 25 and 26 with aperture 25 being disposed in the forward body portion 27 and aperture 26 being disposed in the rear body portion 28, as seen in FIGS. 1–2. The left and right sides of each of the forward body portion 27 and rearward body portion 28 are formed so that upon assembly, two axially aligned side or lateral apertures 29 and 30 are formed between the forward and rearward body portions 27 and 28 with the central common axis of apertures 29 and 30 being perpendicular to the central common axis of apertures 25 and 26. The forwardly and rearwardly facing apertures 25 and 26 are preferably of the same diameter as the perpendicularly disposed apertures 29 and 30. To allow for pivotal adjustment of the gripping member 11 and attached flashlight within the mounting bracket 32, the diameter of each of apertures 25, 26, 29, and 30 is larger than the cross-sectional diameter of the channel 23 in the gripping member 11. Through this configuration, the flashlight shown in phantom lines in FIG. 1 extends through the channel 23 in the truncated spherical gripping member 11 and protrudes outwardly from the clamp assembly through either aligned apertures 25 and 26 or 29 and 30, depending on the desired orientation of the flashlight with respect to the handlebar 20.

In use, the flashlight to be carried by the assembly is inserted through the cylindrical channel 23 in the gripping member 11. The mounting bracket 12 is then placed about the gripping member 11 and the handlebar 20 with the barrel of the flashlight aligned with and extending through either aligned apertures 25 and 26 or 29 and 30 depending on the desired orientation with respect to the handlebar 20. On a bicycle handlebar, the flashlight would normally point forwardly through aperture 25. In FIG. 1 the phantom flashlight and gripping member 11 are shown oriented at a right angle from a normal orientation. The fastening members 18 and 19 are then tightened, constricting the spherical gripping member 11 about the barrel of the flashlight, securing the gripping member in place between the upper portions 27 and 28 of the mounting bracket 32 and tightening the lower portions 31 and 32 of the mounting bracket 12 about the handlebar 20. To adjust the angle of the flashlight beam, it is only necessary to loosen the fastening members 18, 19 which relieves the pressure extended by the mounting bracket 12 on the gripping member 11, allowing the flashlight and gripping member to be rotated within and with respect to the mounting bracket to the desired orientation. Retightening the fastening members 18, 19 secures the gripping member 11 and flashlight in the desired orientation. The adjustment provided by this assembly is limited by the diameter of the aligned apertures in the mounting bracket to the maximum allowable deviation of the flashlight from the central axis of the aligned apertures, so that the flashlight barrel will abut the edge of the wall of the apertures through which the flashlight extends. Such deviation, however, allows more than ample adjustment of the flashlight so that it can be rotated to point at an angle less than the horizontal direction and thus focus on a point along the straight ahead path of the bicycle. The spherical gripping member may also be rotated so that the channel 23 and, thus the flashlight, point in a direction along the longitudinal direction of the tube 20. In such a mounting, the flashlight would be mounted within the assembly such that it would extend through side apertures 29 and 30 in the mounting bracket as opposed to apertures 25 and 26 for a forward pointing securement.

It is also intended that filters, such as a red, yellow, or green filter may be used in conjunction with the flashlight, and that the flashlight placed in the flashlight clamp assembly may be used to perform a safety or warning function as well as an illuminating function.

Although the flashlight mounting assembly is intended primarily for use on bicycle handlebars to provide for illumination of the bicycle path during darkness, numerous other uses may be made of the flashlight holder clamp. For example it may be used on backpack frames and as an aid to illumination or for providing warning illumination in conjunction with virtually any other device, member, or surface onto which the clamp may be fastened.

By reference to FIGS. 7 and 8 a second preferred embodiment is shown. In the FIGS. 7 and 8 embodiment, the mounting bracket material is of a plastic construction. In FIGS. 7 and 8 like parts as shown in FIGS. 1–6 are illustrated with the same reference numerals and lead lines. For example the same truncated spherical gripping member 11 with a cylindrical channel 23 and slots 24 are shown. In FIGS. 7 and 8 like parts having the different, or plastic material of construction are shown with a prime designation after the numeral. Thus for example the forward housing unit is labeled as 27$^1$ and the rearward housing unit is designated as 28$^1$. As shown in FIG. 8 the mid region 17$^1$ is formed with recesses sized to accommodate the male portion 18 and female portion 19 of the male/female screw fastener. The head of the screw also has a slot dimensioned to accept a popular coin of a desired country, for example a U.S. quarter. Reinforcing ribs 21$^1$, 22$^1$ as shown in FIGS. 7 and 8 provide an additional measure of support between the upper and lower regions of the clamp assembly. The thickness of the housing members 27$^1$ and 28$^1$ are not critical, provided that the thickness provides sufficient strength and support for the mounting bracket and the contained gripping member 11. As may be noted by comparing FIGS. 2 and 8, the FIG. 8 housing members 27$^1$ and 28$^1$, when made of the plastic material, are thicker than the members 27 when made of metal, as shown in FIG. 2. As also is show, in FIGS. 1–4 and 7–8 the edges of the housing are rounded off to preclude having sharp or rough edges, and may be rounded or smoothed in a variety of aesthetically pleasing ways, such as shown in corresponding U.S. Design Pat. No. D 308,731.

Although the above embodiments show a single fastening means such as a male/female screw fastener which accomplishes both functions of holding the housing pieces of the mounting bracket 12 together so that it may be clamped onto a support structure such as a bicycle handlebar 20, and of constricting the gripping member 11 around the flashlight barrel at channel 23 to achieve a gripping effect, the flashlight holder clamp may be constructed with other fastening means which perform so that different fastening means perform each of these separate functions. For example the mounting bracket may have one fastening means to clamp onto the held device, such as the bicycle handlebar while a second clamping means could be used to tighten down on the gripping member 11. The next preferred embodiment illustrates this concept.

Figure 9:
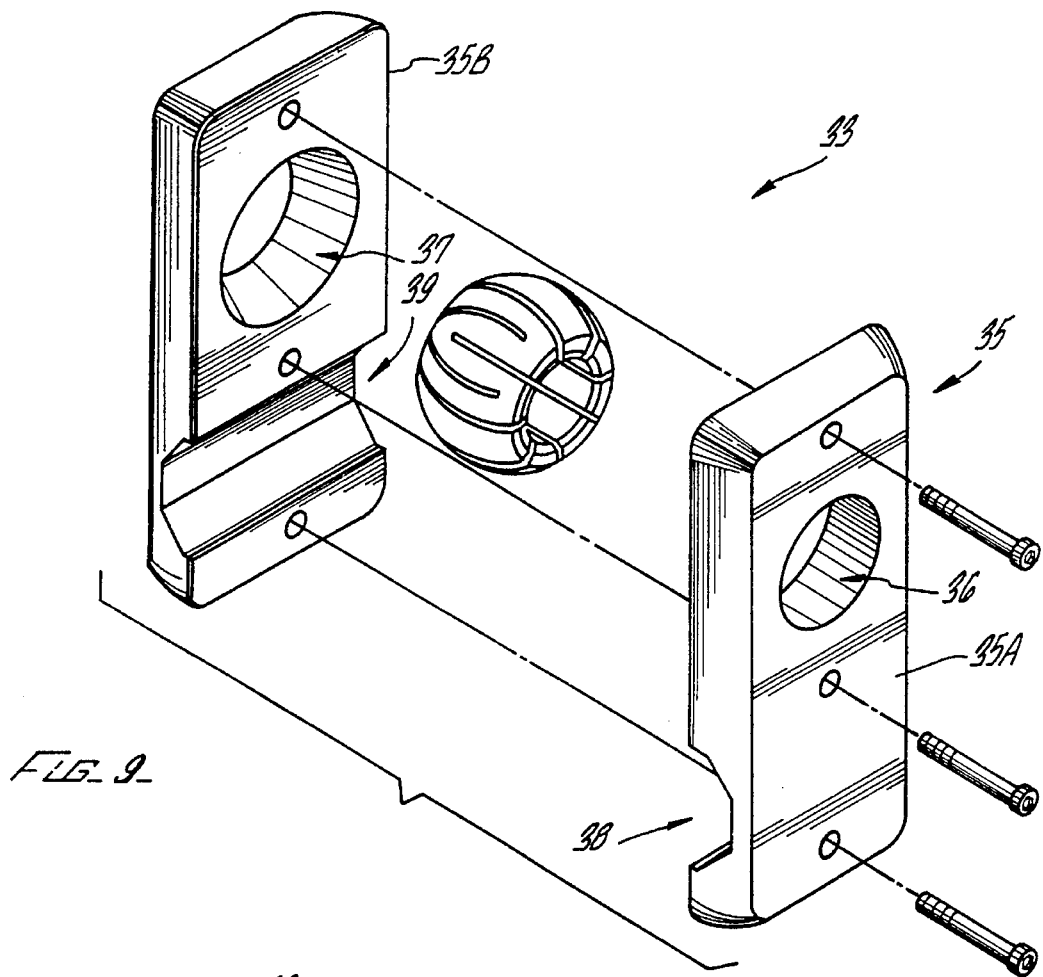
FIG. 9 is an exploded perspective view of a third preferred embodiment of the flashlight holder clamp assembly.
Figure 10:
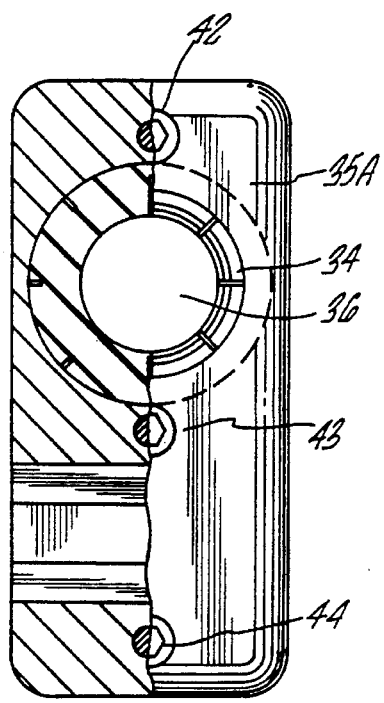
FIG. 10 is a front elevation, partial cross-section view of the FIG. 9 assembly.
Figure 11:
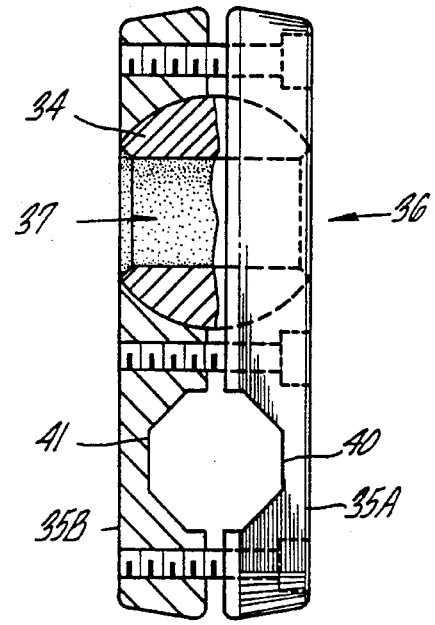
FIG. 11 is a side elevation, partial cross-section view of the FIG. 9 assembly.

Referring to FIGS. 9–11 a third preferred embodiment will be described. The alternate assembly is generally shown at mounting bracket 35. The gripping member 34 is like that previously described with respect to FIGS. 1–8. The mounting bracket 35 provides for one pair of upper aligned apertures 36 and 37, with aperture 36 disposed in body portion 35A of mounting bracket 35 and with aperture 37 disposed in body portion 35B. The mounting bracket 35 also provides for one pair of lower aligned apertures 38 and 39, with a portion of each of the apertures defined by the body portions 35A and a portion defined by the body portion 35B. As shown in FIG. 11 one portion 40 is defined in body portion 35A and one portion 41 is defined in body portion 35B. The lower pair of aligned apertures are oriented at 90° with respect to the upper pair of aligned apertures, as illustrated in FIGS. 9–11. This embodiment features simplicity of construction and is intended for use where the beam of light is to be directed generally at right angles from the direction of the axis of the support member. Conventional fittings 42, 43, and 44 and materials of construction as described above may be used with this embodiment. The functions of the preferred embodiment of FIGS. 9–11 may be accomplished with a variety of designs, shapes, and styles.

Figure 12:
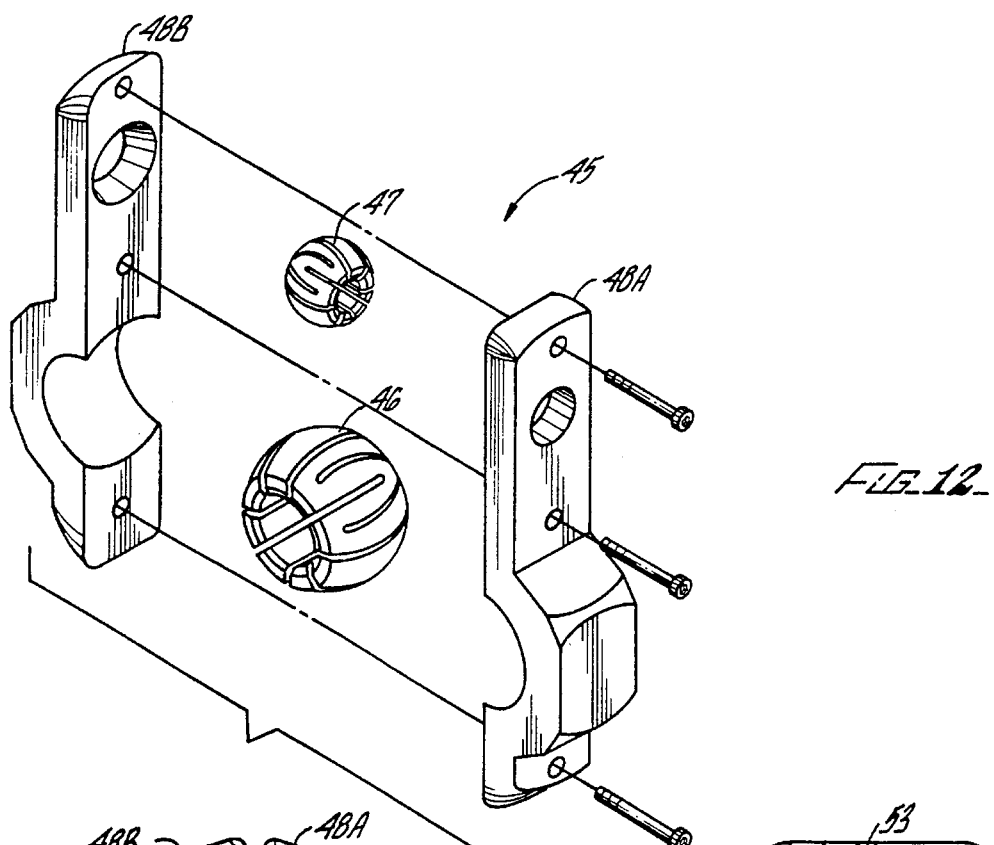
FIG. 12 is an exploded perspective view of a fourth preferred embodiment of the flashlight holder clamp assembly.
Figure 13:
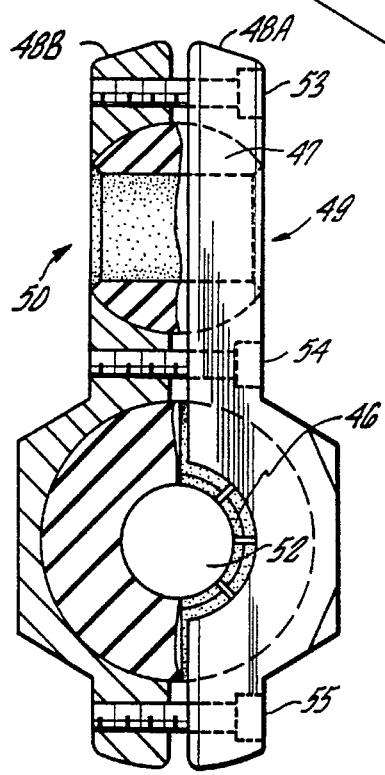
FIG. 13 is a side elevation, partial cross-section view of the FIG. 12 assembly.
Figure 14:
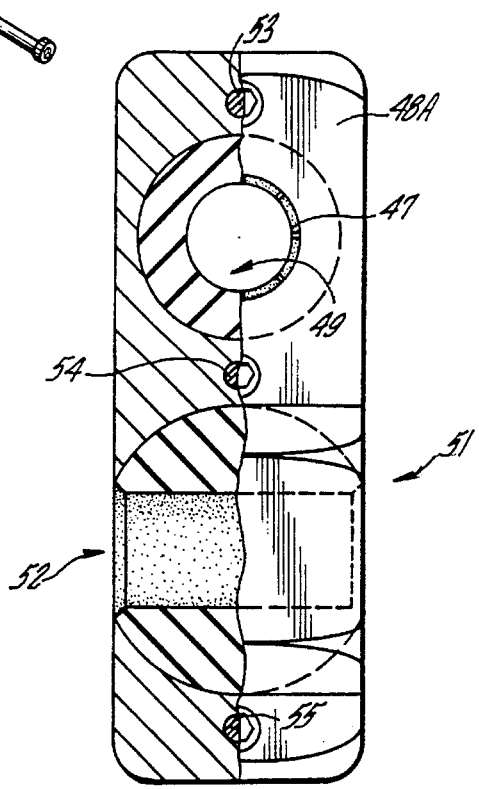
FIG. 14 is a front elevation, partial cross-section view of the FIG. 12 assembly.

Referring to FIGS. 12–14 a fourth preferred embodiment will be described. This alternate assembly is generally shown at 45 and comprises two truncated spherical gripping members 46 and 47 positioned in a mounting bracket 48. Gripping members 46 and 47 are like that previously described with respect to FIGS. 1–11. The mounting bracket 48 provides for one pair of upper aligned apertures 49 and 50, with aperture 49 disposed in body portion 48A of mounting bracket 48 and with aperture 50 disposed accommodation of lower gripping member 46, which may be of the same or a different size than the upper gripping member 47, and for a pair of lower aligned apertures 51 and 52. As shown in FIGS. 9–14, the lower apertures are each defined by a portion of the body portions 48A and 48B.

The materials of construction and fittings or fastening means 53, 54, and 55 are as described above with reference to FIGS. 1–11.

The embodiment of FIGS. 12 to 14 provide means for the additional functions for easy and significant rotational and/or other adjustment of the assembly with respect to the axis of the support member. This is accomplished through provision of the lower spherical member 46 and the lower aligned apertures 51 and 52.

Referring to FIGS. 15 to 17 a fifth preferred embodiment will be described. This alternate assembly has upper and lower truncated spherical gripping members 56 and 57, as described above with respect to the fourth preferred embodiment. The fifth preferred embodiment also provides for two pairs of upper aligned apertures and two pairs of lower aligned apertures for increased adjustment of the flashlight beam direction with respect to the axis of the support structure. The upper aligned apertures are shown at 58, 59, 60, and 61 and are mutually perpendicular. The lower aligned apertures are shown at 62, 63, 64, and 65 and are also mutually perpendicular. Fasteners are shown at 66, 67, and 68 and are of the type described previously. Materials of construction are also as described previously. Slot 69 provides for holding a security wrench, such as a right angle, hex allen wrench, as shown in FIG. 15. A plastic sleeve 70 may also be provided in the slot 69 to aid in holding the security wrench.

In the embodiment shown in FIGS. 15 to 17, the clamp assembly may be affixed to the support structure to either pair of lower aligned apertures and, due to the lower spherical gripping member feature, may also be adjusted rotationally and/or at other angles with respect to the axis of the support member. As described above with respect to FIGS. 1–8, the flashlight may be affixed to extend through either pair of upper aligned apertures and may also be radially and/or pivotally adjusted laterally with respect to the clamping assembly mounting bracket. Thus, this embodiment provides for increased adjustment of flashlight beam direction with respect to the axis of the support structure used.

The functions of the three embodiments shown in FIGS. 9–17 may be accomplished with various designs, shapes and overall configurations. The specific shapes, styles and overall configurations shown in FIGS. 9–17 are subject matter of commonly assigned U.S. Patent Application Attorney Docket No. 191/67.

Figure 19:
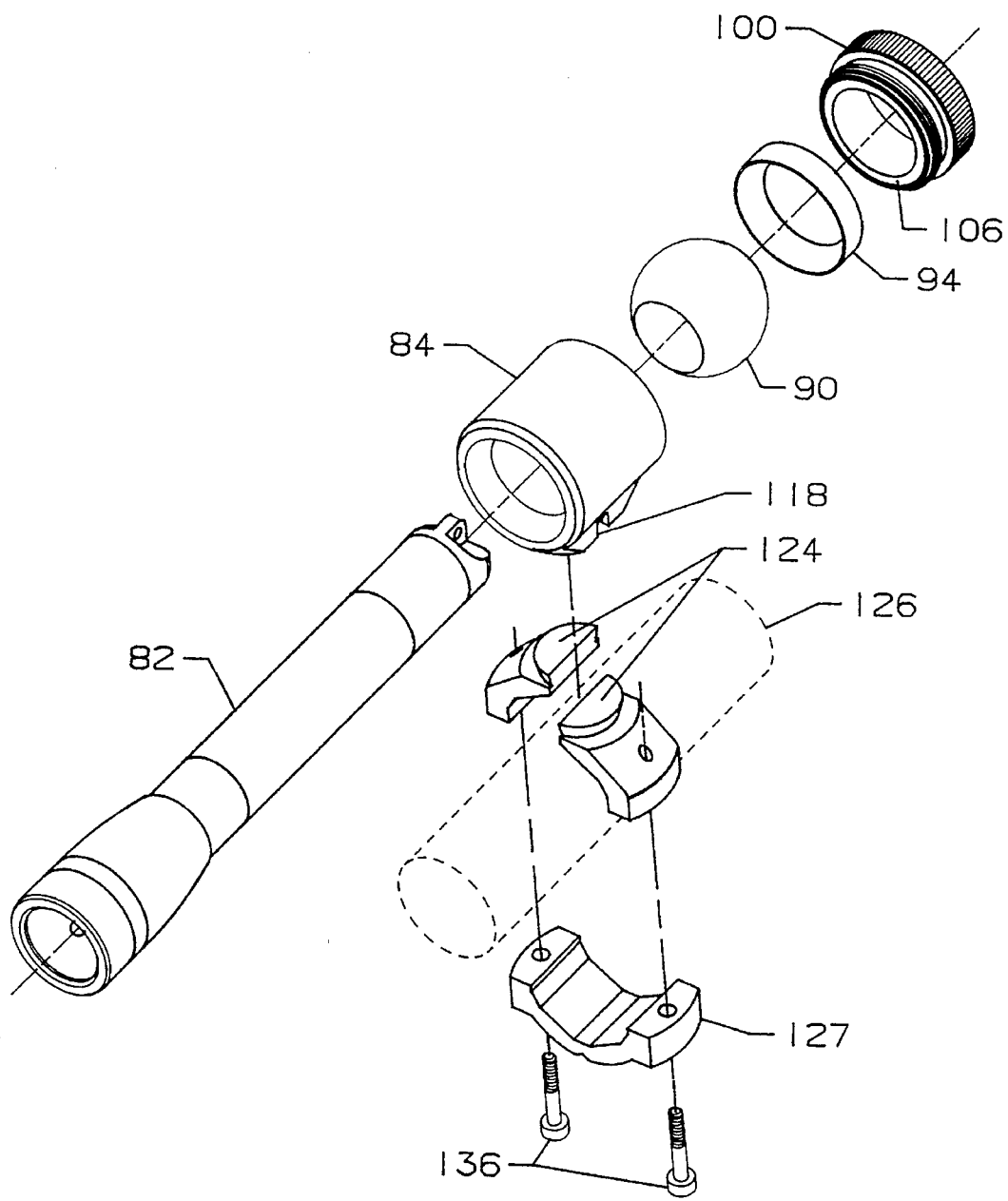
FIG. 19 is an exploded perspective view of another preferred embodiment of the holder clamp assembly illustrating the compressing mechanism and the double action inverting clamp with a flashlight mounted parallel to the substrate.

Referring to FIG. 19–29, another preferred embodiment will be described. FIG. 19 illustrates the assembly of the holder clamp assembly. The flashlight shown is inserted into the compressing mechanism wherein it may be pivoted relative to the compressing mechanism. In the preferred embodiment, the compressing mechanism is pivotally attached to the mounting bracket by a swivel joint, and the compressing mechanism can pivot 360° relative to the mounting bracket. The mounting bracket then attaches to a substrate support member, and the mounting bracket may pivot radially 360° relative to the substrate support member. Thus, this embodiment when used with a flashlight provides the maximum adjustment of flashlight beam direction with respect to the axis of the substrate. By tightening the mounting bracket, the compressing mechanism and the mounting bracket are clamped and locked in position.

FIG. 20 further illustrates the preferred embodiment of the holder clamp assembly shown in FIG. 19. The compressing mechanism, generally designated 80, is shown assembled and holding a flashlight 82. The body 84 of the compressing mechanism 80 is illustrated by FIG. 21A and FIG. 21B. The body 84 is generally the shape of a hollow cylinder, but having three distinct inner surfaces. First, there is a section 86 the shape of a frustum of a right circular cone which is illustrated by the cross-section view in FIG. 21B. The frustum shaped section 86 leaves open space for the flashlight 82 to pivot in. Though a frustum of a right circular cone is used in the preferred embodiment, any other shape, such as parabolic, which leaves the equivalent space open would be functional. Second, there is a spherically shaped contour section 88. This spherically shaped counter section forms a retainer cavity. The surface 88 allows a gripper 90 to rotate and, along with a washer 94, compresses the gripper 90 when the lock 100 is tightened against the washer 94. A third section 92 is threaded. In the preferred embodiment the body threads 92 are on the inner surface, but the device could be adapted to have the body threads 92 located on the outer surface. The body threads 92 preferably should be fine, so that small adjustments in the compressive force can be made.

The washer 94, which is one component of the retainer, is illustrated in FIG. 22A and FIG. 22B and has two important surfaces. The contour of a front surface 96 is spherical in shape while a rear surface 98 is flat and smooth. The front surface 96 serves the same purpose as the surface 88 of the body 84. It allows the gripper 90 to rotate when a lock 100 is loosened, and when the lock 100 is tightened against the washer 94, it compresses the gripper 90 holding the gripper 90 and thus the flashlight 82 in place. The rear flat surface 98 is like a typical washer and serves the same function as a typical washer. The flat rear surface 98 bears the friction incurred during the tightening and loosening of the lock 100 against the washer 94. Thus, the life of the gripper 90 is extended.

The adjustable lock or end component 100, which is the second part of the retainer, is illustrated by FIG. 23A and FIG. 23B. The component 100, which is substantially a hollow cylinder, has four significant features. One feature is the threads 102. Component 100 screws into the body 84 thereby tightening the component 100 against the washer 94 and locking the flashlight in a fixed position. Thus, the body threads 92 and the threads 102 comprise the preferred embodiment of a tightening mechanism. Alternate tightening mechanisms can be used such as latches similar to those used to close a tool box. A second feature is a frustum shaped inner surface 104. In the preferred embodiment, the frustum is of a right circular cone. The frustum shaped surface 104 allows the flashlight 82 to be pivoted and adjusted in the compressing mechanism 80 when the component 100 is loosened. A third feature of the component 100 is the smooth face 106. The smooth face 106 serves the same purpose as a typical washer helping to dissipate the friction of tightening and loosening. Finally, the outer rim 108 of the component 100 is ribbed making it easier to grip while tightening and loosening the component 100.

The gripper 90 shown in FIG. 24A is substantially spherical with truncated ends and made of a compressible material preferably a plastic that has good strength, elasticity, and forming characteristics such as one of the many nylon base materials commercially available. The gripper 90 is also designed to absorb any shock encountered. Because of the washer 94 used in this embodiment, the gripper 90 does not require the longitudinal slots. In the preferred embodiment, the spherical gripper 90 contains a centrally located cavity 110 that is cylindrical in shape. The gripper cavity 110 receives a substantially circular member such as a flashlight barrel, and when the lock 100 is tightened into the body 84 and against the washer 94, the gripper 90 constricts around the member holding it in place. Before the lock 100 is tightened, the spherical gripper 90 and the member can be rotated in the compressing mechanism 80. Before the lock 100 is tightened, the flashlight can also be adjusted longitudinally within the cavity 110. As shown in FIG. 24B, the flashlight 82 can be moved in a circular pattern 112 or anywhere within that pattern 112.

Figure 25A:
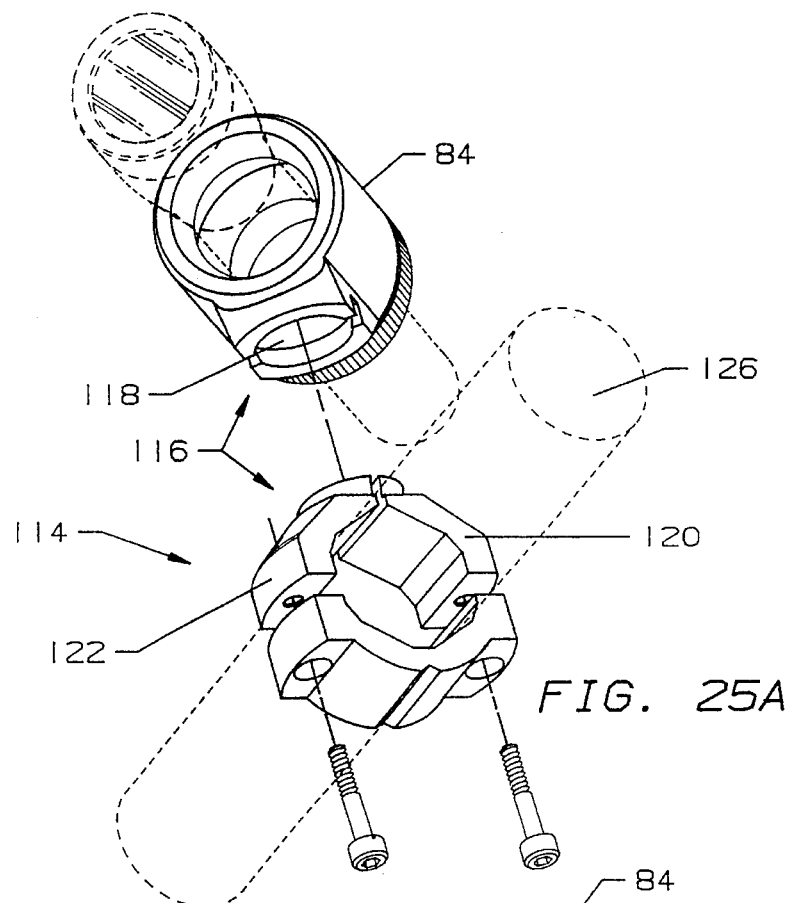
FIG. 25A is a perspective view of the swivel joint with the mounting bracket on a large substrate.
Figure 25B:
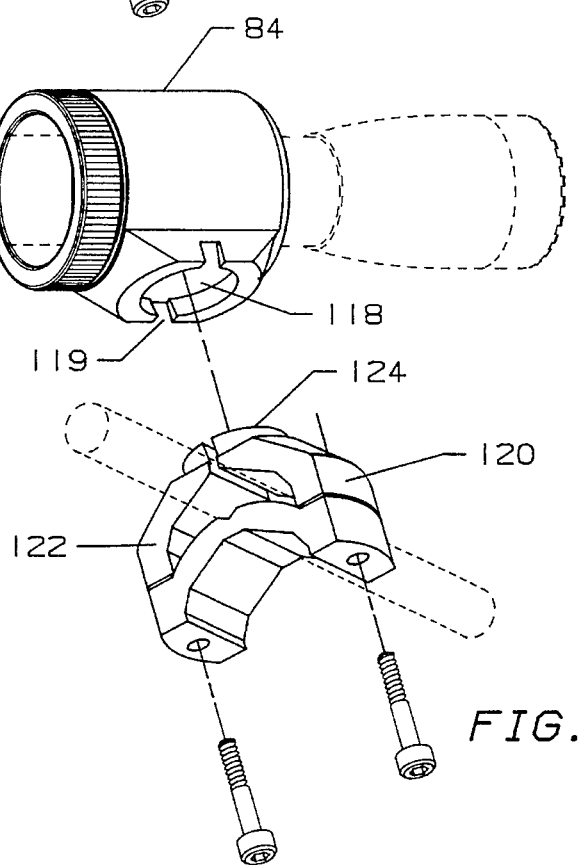
FIG. 25B is a perspective view of the swivel joint with the mounting bracket on a small substrate.
Figure 25C:
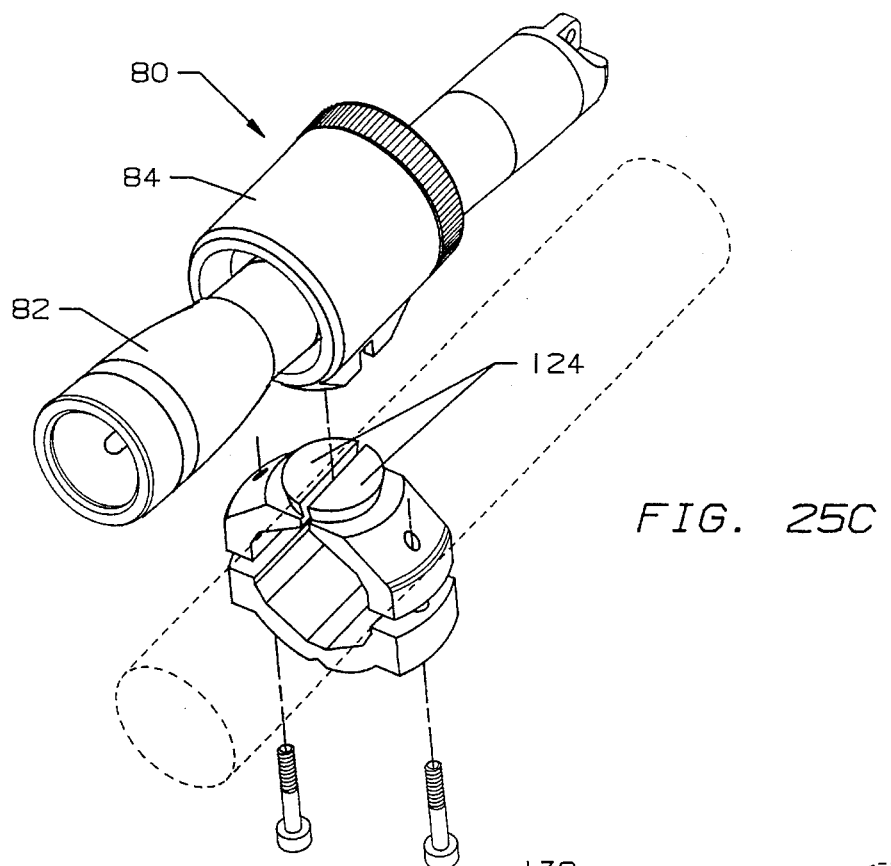
FIG. 25C is an illustration of the flashlight swiveled to an angle other than 90° with the substrate.

In the preferred embodiment, the body 84 is attached to the mounting bracket, generally designated 114, by a swivel joint, generally designated 116, and shown in FIG. 25A, FIG. 25B, and FIG. 25C. The exterior of the body 84 has an open area or mounting cavity 118 the shape of a frustum of a right circular cone, and the two split members 120 and 122 of the mounting bracket 114 form a solid frustum 124 (see FIG. 25C) of a right circular cone similarly oriented with the open frustum area 118. The solid frustum 124 fits inside the open frustum 118, and thus, the body 84, unless locked, may pivot infinitely in both directions. On both sides of the open area 118 is a slot 119. The slot 119 allows the solid frustum 124 to be inserted into the open frustum 118. FIG. 25C shows the flashlight 82 pivoted to an angle other than 90° with the substrate 126 shown in phantom lines.

Figure 26:
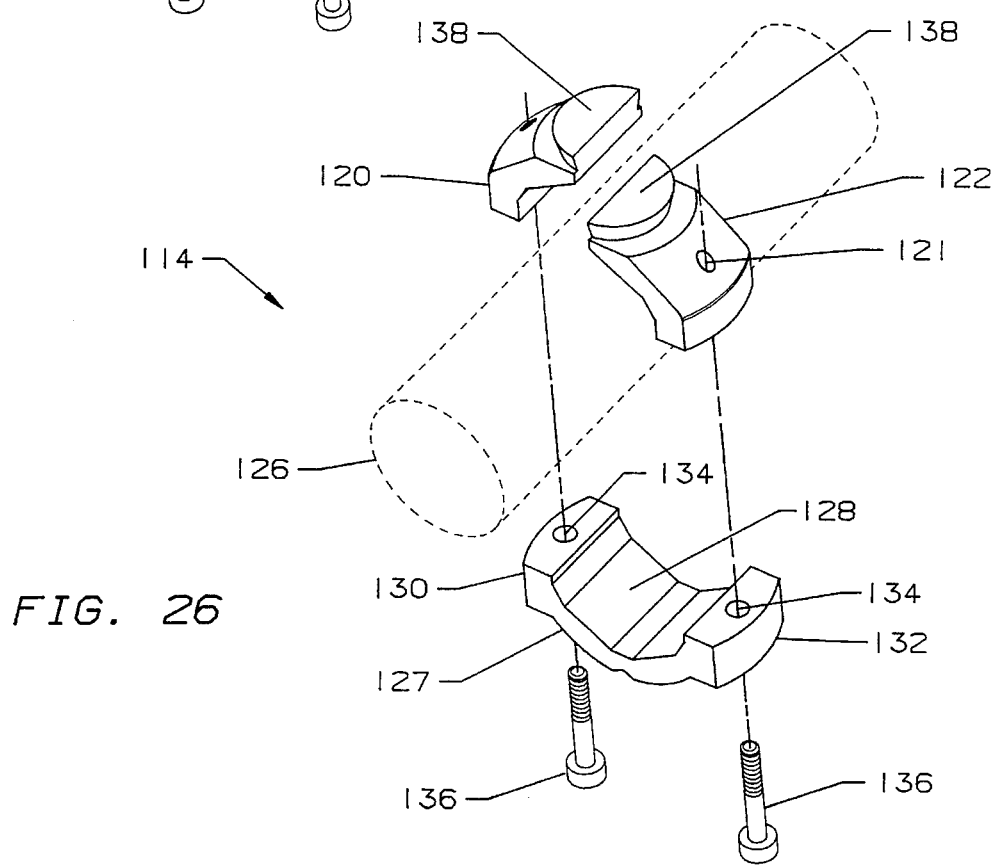
FIG. 26 is an exploded perspective view of the mounting bracket.

Referring to FIG. 26, the mounting bracket 114 includes three members. The inside gripping surface 128 of the primary member 127 is substantially a half cylinder. Each end 130 and 132 of the primary member 127 has a hole 134 for inserting screws 136. Another half circle is completed by two split members 120 and 122. In the preferred embodiment, the split members 120 and 122 are identical and each defines approximately ¼ of a cylinder, but variations between the split members 120 and 122 can be incorporated. The split members 120 and 122 also each have a hole 121 for receiving a screw 136. The split members 120 and 122 attach to the ends 130 and 132 of the primary member 126 with the screws 136. Though screws 136 are preferred, other tightening methods may be used. Finally, the tops of the split members 120 and 122 have protrusions 138. These protrusions 138 form the solid frustum 124 of the swivel joint 116 between the body 84 and the mounting bracket 114. The two members 120 and 122 are split to allow insertion of the solid frustum 124 into the body 84.

Figure 27:
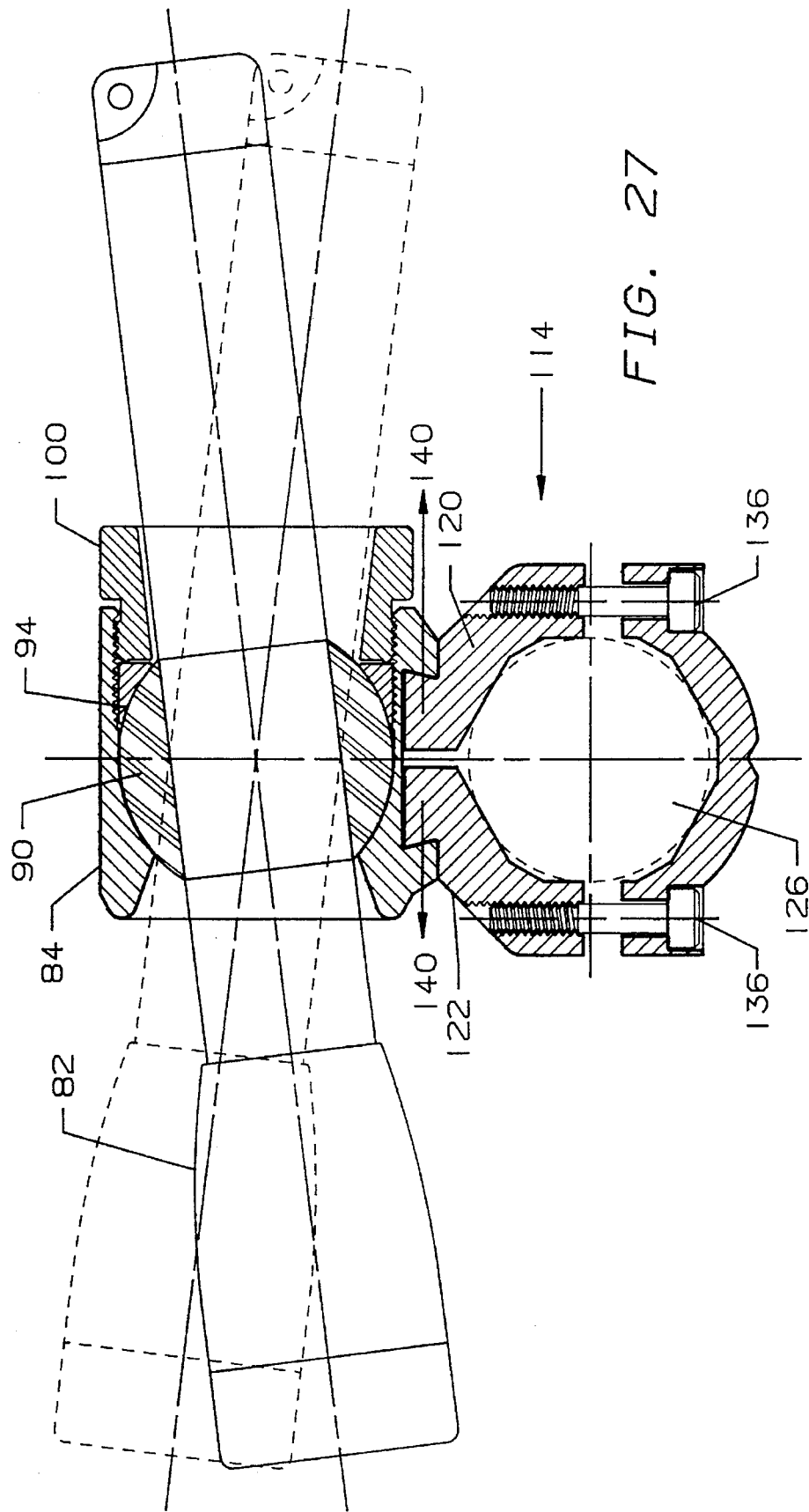
FIG. 27 is a cross-section of the holder clamp assembly including the compressing mechanism and the mounting bracket.

The mounting bracket 114 further acts as a double clamp as shown in FIG. 27. By tightening the screws 136 the mounting bracket 114 constricts around the substrate 126, and as the mounting bracket 114 constricts the split clamp members 120 and 122 pull outward against the body 84 as illustrated by arrows 140 on FIG. 27. Thus, the body 84 is held in position and eventually locked when the screws 136 are sufficiently tightened.

Figure 28A:
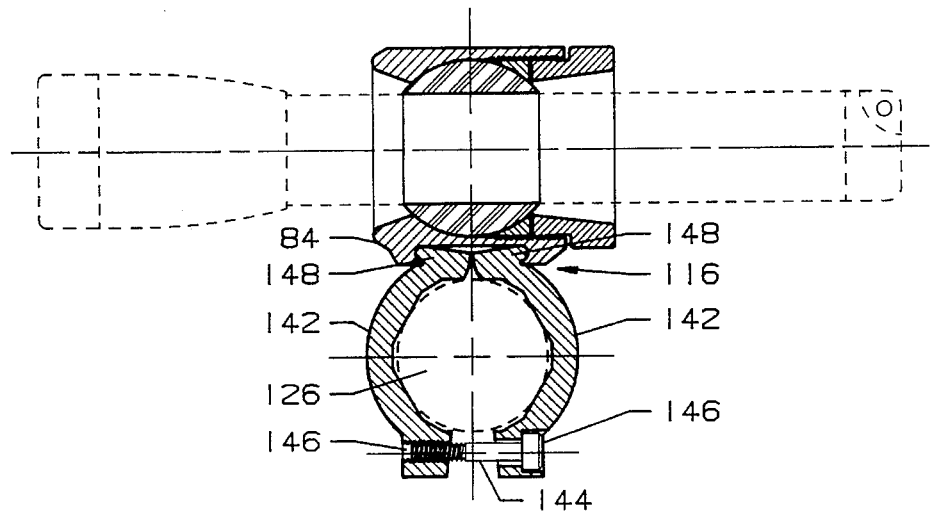
FIG. 28A is a cross-section side view of an alternate embodiment of the mounting bracket.
Figure 28B:
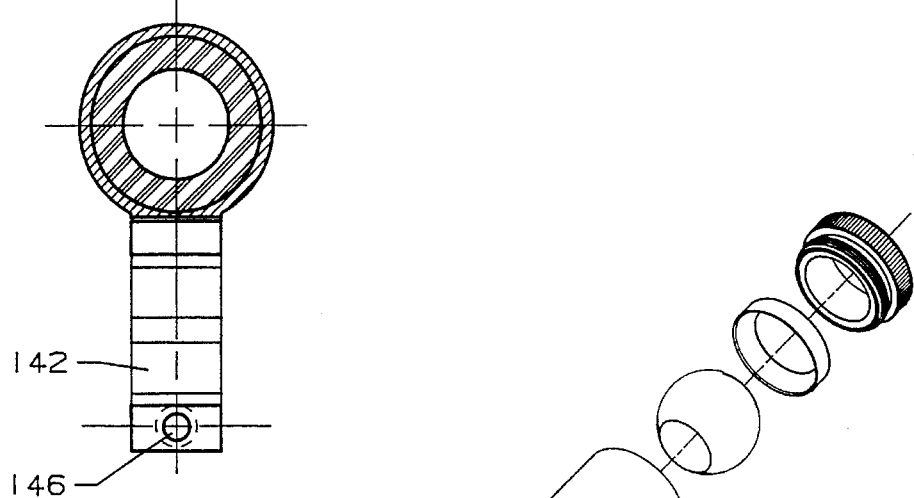
FIG. 28B is a cross-section end view of the alternate mounting bracket.

An alternate configuration of the double clamp is shown in FIG. 28A and FIG. 28B. This configuration has the same double clamping feature but uses two members 142 and one screw 144. The two members 142 are substantially half circles with holes in the bottom for receiving the screw 144. The top of the members have protrusions 148 which again form the solid frustum 124 of the swivel joint 116. As the screw 144 is tightened, the members 142 constrict on the substrate 126, and the tops of the members pull outward holding the body 84 in position.

Figure 29A:
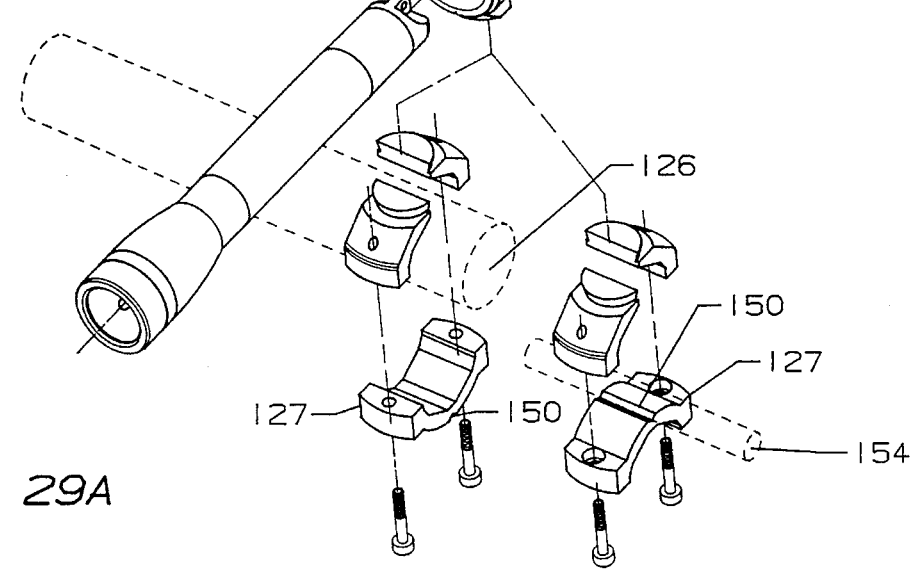
FIG. 29A is an exploded perspective view of the inverted mounting bracket.
Figure 29B:
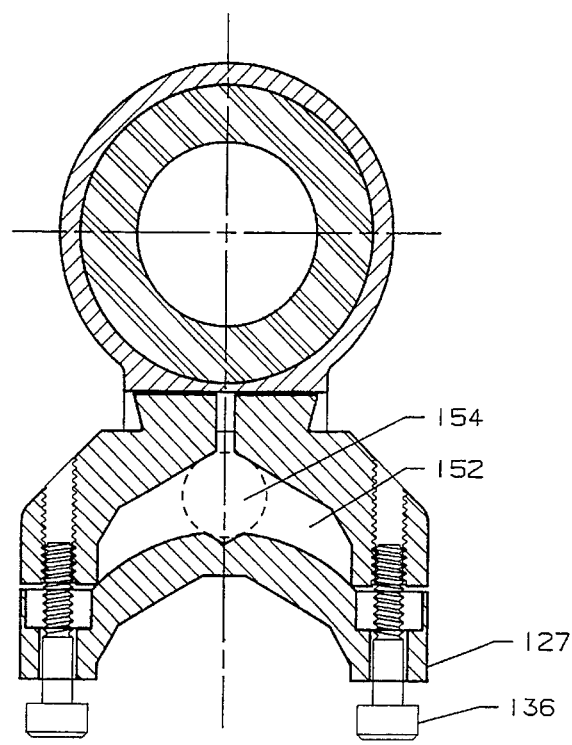
FIG. 29B is a cross-section of the inverted mounting bracket clamped onto a small substrate.
Figure 30:
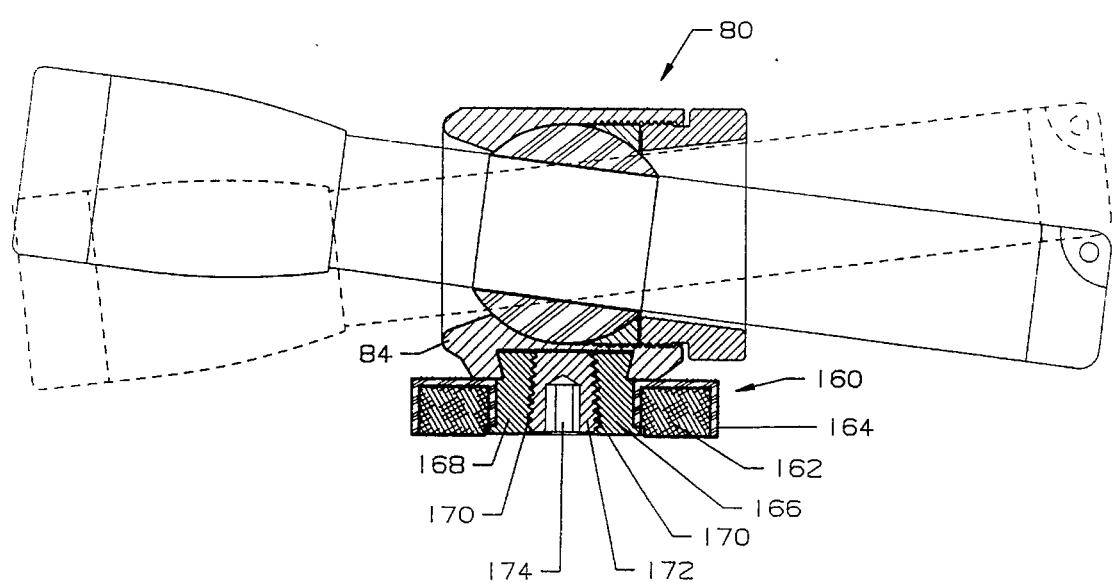
FIG. 30 is a cross-sectional view of an alternate magnetic mounting mechanism.

The primary member 127 of the mounting bracket may also be inverted as demonstrated by FIG. 29A and FIG. 29B. The primary member 127 of the mounting bracket 114 has a groove 150 on the underneath side. By inverting the primary member 127 relative to the split members 120 and 122, the mounting bracket 114 forms a crescent moon shape 152 as shown in FIG. 29B. The mounting bracket 114 may now hold a smaller substrate 154, and the groove 150 holds the substrate 154 in position. This feature permits the mounting bracket 114 to be mounted on substrates having varying ranges of cross-sectional thicknesses.

As an alternate embodiment to the mounting bracket 114, a magnetic base, generally designated 160, can be used to mount the compressing mechanism 80 to a support structure. In this embodiment, a magnet 162 is contained in a plastic housing 164. The magnet then holds the compressing mechanism 80 to the support structure. The magnetic base 160 connects to the body 84. The tops of two members 166 and 168 form a solid frustum of a cone which fits into the hollow frustum 118 of the body 84. The inside surfaces 170 of the members 166 and 168 are threaded. Once the solid frustum is inserted into the hollow frustum 118, a tapered plug 172 is threaded between the members 166 and 168.

Thus, the members 166 and 168 are expanded outward locking the body 84 in position. The plug 172 contains a recess 174 into which a hex wrench may be inserted to thread the plug 172 between the members. The magnetic base 160 allows the holder clamp assembly to be mounted in many different locations where there may not be a structure compatible with the mounting bracket 114.

Having set out each component of the holder clamp assembly, their relationships may be discussed. Referring back to FIG. 19, the body 84 of the compressing mechanism 80 has the spherical gripper 90 and the washer 94 inserted into it, and the lock 100 screws into the body 84. The spherical gripper 90 rotates inside the surfaces 88 and 96 created by the body 84 and the washer 94, respectively. A flashlight or other device 82 can, therefore, be pointed in numerous directions as shown in FIG. 24B. By tightening the lock 100 into the body 84 as FIG. 27 illustrates, the spherical gripper 90 is constricted around the device 82 by the spherical surface 88 of the body 84 and washer 94 and thus the device 82 is held in position and eventually locked. As the lock 100 is tightened, its smooth face 106 slides on the rear flat surface 98 of the washer 94. Thus, the friction created when screwing the lock 100 into the body 84 is not transferred to the spherical gripper 90, and the spherical gripper 90 does not twist. The flashlight beam is adjusted by partially unscrewing the lock 100 from the body 84 which relieves the pressure on the gripping member 90. A flashlight or other device 82 may also be adjusted longitudinally relative to gripper 90 by sliding the flashlight 82 in the gripper 90, and the flashlight beam is then again adjusted by rotating the flashlight 82 and the gripper 90 in the compressing mechanism 80.

The solid frustum 124 defined by the mounting bracket 114 fits into the hollow frustum 118 on the body 84, and the body 84 is able to rotate a full 360° in either direction relative to the mounting bracket 114. Once the desired position is obtained, the body 84 can be held in place and eventually locked in position by tightening the screws 136 of the mounting bracket 114. As mentioned before, tightening the screws 136 also constricts and clamps the mounting bracket 114 around the substrate 126. The mounting bracket 114 can also be rotated a full 360° in either direction relative to the substrate 126. The mounting bracket 114 can be attached to various substrates. Though mounting a flashlight on a bicycle is a primary application of the holder clamp assembly, it can also be used on lawn mowers, wheelchairs, rifle barrels, wheel barrows, or any other apparatus having an elongated substrate support member. Further, the holder clamp assembly, though intended primarily for holding a flashlight, might also hold a scope, motion sensor, flood light, or any other device having an elongated, generally cylindrical section. A final feature which adds to the adjustability of the holder clamp assembly is that the flashlight 82 may be adjusted without loosening the mounting bracket 114 or the pivot joint 116, and the pivot joint 116 may be adjusted without moving the flashlight 82 relative to the compressing mechanisms 80.

Finally, the external appearance of the holder clamp assembly can take many forms, but the present external appearance was chosen because of its aesthetics.

Thus, a holder clamp assembly is disclosed which employs a compressing mechanism to hold devices while mounting them to convenient apparatus. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An assembly comprising a compressible, substantially spherical member having a generally centrally located cavity, a compressing mechanism generally surrounding said compressible member, a mounting bracket, a swivel joint attaching said mounting bracket to said compressing mechanism, said cavity being to receive an object, and said compressing mechanism constricting said cavity around said object, said mounting bracket having a split head, said split head being a base for said swivel joint, said mounting bracket defining an aperture for receiving a substrate, said aperture constricting to lock said mounting bracket as said mounting bracket is tightened, and said split head expanding to lock said swivel joint as said mounting bracket is tightened.

2. The assembly of claim 1 wherein said cavity is to receive an object having a first axis, said object being adjustable along said first axis relative to said compressible member, said compressing mechanism having open ends, said open ends defining a second axis, said open ends being larger than said cavity allowing said first axis to be adjusted to a plurality of angles with said second axis.

3. The assembly of claim 1 wherein said swivel joint defines an axis, the rotation of said compressing mechanism defines a plane, said axis being normal to said plane, said compressing mechanism adjustable in said plane.

4. The assembly of claim 1 wherein said mounting bracket defines an aperture for receiving a substrate, said mounting bracket being radially adjustable around said substrate.

5. A mount comprising
 a compressing mechanism having a first inner surface defining a portion of a sphere, a second inner surface defining a portion of a sphere, said first inner surface opposing said second inner surface;
 a tightening mechanism advancing said second inner surface toward said first inner surface;
 a mounting bracket displaced from and connected to said compressing mechanism;
 a compressible member having a generally centrally located substantially cylindrical cavity, a substantially spherical outer surface, and said compressible member being positioned between said first inner surface and said second inner surface; and
 a swivel joint attaching said compressing mechanism to said mounting bracket and including a first body defining a first frustum, a second body defining approximately ½ frustum, a third body defining approximately ½ frustum, said second and third bodies together defining a split frustum similarly oriented to said first frustum, said split frustum fitting inside said first frustum.

6. The mount of claim 5 wherein said tightening mechanism comprises a first compression element having threads, a second compression element having threads, said first compression element threading into said second compression element.

7. The mount of claim 5 wherein said cavity is to receive a generally cylindrical device having a first axis, said device is adjustable along said first axis relative to said compressible member, said compressing mechanism having open ends, said open ends defining a second axis, said open ends being larger than said cavity allowing said device to be adjusted to a plurality of angles with respect to said second axis.

8. The mount of claim 7 wherein said split frustum rotates inside said first frustum allowing said compressing mechanism to be pivotally adjusted relative to said mounting bracket.

9. The mount of claim 7 wherein said mounting bracket is a double clamp comprising
 a first clamping member having an inner surface defining approximately ½ cylinder, a first end, and a second end;
 a second clamping member having an inner surface defining approximately ¼ cylinder, a first protrusion, said second clamping member attached to said first end;
 a third clamping member having an inner surface defining approximately ¼ cylinder, a second protrusion, said second clamping member attached to said second end such that said first and said second protrusion are opposed; and
 said first protrusion and said second protrusion together define said split frustum.

10. The mount of claim 9 wherein said first, said second, and said third clamping members define an aperture for receiving a substrate, said aperture constricts around said substrate locking said mounting bracket as said mounting bracket is tightened, and said split frustum expands in said first frustum locking said swivel joint as said mounting bracket is tightened.

11. The mechanism of claim 9 wherein said first clamping member has an outer surface such that when said first clamping member is inverted relative to said second and said third clamping members said outer surface engages a substrate.

12. The mechanism of claim 11 wherein said outer surface of said first clamping member includes a groove adapted to receive a substrate.

13. The mount of claim 7 wherein said mounting bracket is a double clamp comprising:
 a first clamping member being approximately a half cylinder, having a first end, a second end, and a first protrusion from said first end;
 a second clamping member being approximately a half cylinder, having a third end, a fourth end, and a second protrusion from said third end; and
 said second end is attached to said fourth end and said first protrusion with said second protrusion form said split frustum.

14. The mount of claim 13 wherein said first and said second clamping members define an aperture for receiving a substrate, said aperture constricts around said substrate locking said mounting bracket as said mounting bracket is tightened, and said split frustum expands in said first frustum locking said swivel joint as said mounting bracket is tightened.

15. A double clamping mechanism comprising
 a first clamping member having a first inner surface defining approximately ½ cylinder, a first end, and a second end;
 a second clamping member having a second inner surface defining approximately ¼ cylinder, a first protrusion, said second clamping member attached to said first end;
 a third clamping member having a third inner surface defining approximately ¼ cylinder, a second protrusion, said second clamping member attached to said second end such that said first protrusion and said second protrusion are opposed; and
 a fourth member having a cavity, said first protrusion and said second protrusion being inserted into said cavity.

16. The mechanism of claim 15 wherein said first, said second, and said third clamping members define an aperture for receiving a substrate, said aperture constricts around said substrate locking said first, said second, and said third members, and expanding said first and said second protrusions in said cavity locking said fourth member.

17. The mechanism of claim 15 wherein said first protrusion and said second protrusion define a frustum.

18. A mount comprising a compressing mechanism including a first compression element, a second compression element, and a third compression element;

said first compression element having a first inner surface defining a portion of a sphere, said second compression element fitting inside said first compression element having a second inner surface defining a portion of a sphere, said first inner surface opposing said second inner surface, a tightening mechanism operatively coupling said third compression element with said first compression element;

a mounting bracket displaced from and connected to said first compression element, said mounting bracket having an aperture for receiving a substrate, said mounting bracket including an aperture which constricts when said mounting bracket is tightened, a split head which expands locking said compressing mechanism when said mounting bracket is tightened;

a compressible member having a centrally located substantially cylindrical cavity for receiving a device, a substantially spherical outer surface, and said compressible member being positioned between said first inner surface and said second inner surface; and said compressible member being rotatably adjustable inside said first and said second inner surface, said first compression element being pivotally adjustable on said mounting bracket, said mounting bracket being radially adjustable around said substrate, and said device being longitudinally adjustable in said cavity.

19. The mount of claim 18 wherein said compressing mechanism constricts said compressible member locking said device and said compressible member.

20. A flashlight holder clamp for a bicycle, comprising a mounting bracket including an aperture for mounting to the bicycle and being selectively rotatable on the bicycle about a first axis;

a compressing mechanism being mounted to and selectively rotatable on said mounting bracket about a second axis substantially perpendicular to said first axis;

a gripper partially surrounded by said compressing mechanism and including a gripper cavity therethrough for receiving the flashlight, said gripper being selectively rotatable in said compressing mechanism.

21. The flashlight holder clamp of claim 20 wherein said gripper cavity extends through said gripper to selectively slidably receive the flashlight.

22. The flashlight holder clamp of claim 21 wherein said gripper is substantially spherical.

23. The flashlight holder clamp of claim 22 wherein said compressing mechanism includes a body having a retainer cavity with a first truncated spherical surface and a first hole extending from centrally of said first truncated spherical surface through said body and a retainer adjustably positioned in said retainer cavity with a second truncated spherical surface opposed to said first truncated spherical surface and a second hole extending from centrally of said second truncated spherical surface through said body, said gripper cavity being generally axially aligned with said first and second holes.

24. The flashlight holder clamp of claim 23 wherein said first and second holes are of greater opening area than said gripper cavity to allow angular adjustment of said gripper cavity with a flashlight in place.

25. The flashlight holder clamp of claim 20 wherein said mounting bracket further includes a first member and a second member, said first and second members defining a split conical frustum, and said compressing mechanism includes a mounting cavity to receive said split conical frustum, said mounting bracket including a tightening member to expand said split conical frustum for interference fit in said mounting cavity.

26. The flashlight holder clamp of claim 20 wherein said mounting bracket includes a first mounting portion and a second mounting portion, said first mounting portion mounting said compressing mechanism and having a first arcuate surface, said second mounting portion having a second arcuate surface selectively opposed to said first arcuate surface to define said aperture.

27. The flashlight holder clamp of claim 26 wherein said second mounting portion has a gripping surface on the opposite side of said second mounting portion from said second arcuate surface, said second mounting portion selectively mating with said first mounting portion with said gripping surface opposed to said first arcuate surface.

* * * * *